United States Patent
Kim et al.

(10) Patent No.: US 8,778,286 B2
(45) Date of Patent: Jul. 15, 2014

(54) SYSTEM FOR FIXING CARBON DIOXIDE

(75) Inventors: Tae Young Kim, Gyeonggi-do (KR); Sung Yeup Chung, Seoul (KR); Ki Chun Lee, Seoul (KR); Min Ho Cho, Gyeonggi-do (KR); Seok Gyu Sonh, Gyeonggi-do (KR); Dong Cheol Park, Incheon (KR)

(73) Assignees: Hyundai Motor Company, Seoul (KR); Kia Motors Corporation, Seoul (KR); Hyundai Steel Company, Incheon (KR)

( * ) Notice: Subject to any disclaimer, the term of this patent is extended or adjusted under 35 U.S.C. 154(b) by 243 days.

(21) Appl. No.: 13/309,948

(22) Filed: Dec. 2, 2011

(65) Prior Publication Data

US 2013/0064741 A1    Mar. 14, 2013

(30) Foreign Application Priority Data

Sep. 14, 2011 (KR) .................. 10-2011-0092496

(51) Int. Cl.
*B01J 10/00* (2006.01)
*B01D 63/00* (2006.01)

(52) U.S. Cl.
USPC .............. 422/617; 422/616; 210/500.23

(58) Field of Classification Search
USPC .............. 422/616, 617; 210/500.23
See application file for complete search history.

(56) References Cited

U.S. PATENT DOCUMENTS

| 6,706,189 B2 * | 3/2004 | Rabie et al. | 210/636 |
| 7,294,268 B2 * | 11/2007 | Yamasaki et al. | 210/601 |
| 2011/0139628 A1 * | 6/2011 | Teir et al. | 205/564 |

FOREIGN PATENT DOCUMENTS

| JP | 10052689 A | 2/1998 |
| JP | 2005097072 A | 4/2005 |
| JP | 2006150232 A | 6/2006 |
| KR | 10-2005-0001895 | 1/2005 |
| KR | 10-0573223 | 4/2006 |
| KR | 10-2010-0076246 A | 7/2010 |

* cited by examiner

*Primary Examiner* — Lessanework Seifu
(74) *Attorney, Agent, or Firm* — Edwards Wildman Palmer LLP; Peter F. Corless

(57) ABSTRACT

The present invention relates to a system fixing carbon dioxide. The system comprises a first reactor for extracting alkali metal components from a slag and a second reactor for carbonating the extracted alkali metal component with carbon dioxide. With this system, carbon dioxide can be fixed in a simpler and cost-effective manner.

1 Claim, 2 Drawing Sheets

SYSTEM FOR FIXING CARBON DIOXIDE

CROSS-REFERENCE TO RELATED APPLICATION

This application claims under 35 U.S.C. §119(a) the benefit of Korean Patent Application No. 10-2011-0092496 filed Sep. 14, 2011, the entire contents of which are incorporated herein by reference.

BACKGROUND (a) Technical Field

The present invention relates to a system for fixing carbon dioxide contained in an exhaust gas. More particularly, it relates to a system for fixing carbon dioxide by extracting an alkali metal component from a raw slag and reacting the extracted alkali metal component with carbon dioxide to produce a carbonate precipitate which is separated by a submerged membrane unit.

(b) Background Art

Exhaust gases including carbon dioxide in many fields of industry are required to be treated for environmental consideration. A typical process of treating an exhaust gas includes a separation/recovery process and a fixation (immobilization) process.

The fixation process aims to convert carbon dioxide to a carbon-containing compound (e.g., carbonate) and convert the carbon-containing compound to a compound that is applicable to other industrial processes, thereby being able to remove carbon dioxide, which is known to cause global warming, in an environmental-friendly way and utilize carbon dioxide as a useful material.

To date, a single reactor in which alkali metal component extraction from a raw slag is performed concurrently with carbonation reaction has been used. However, in this conventional method, because the alkali metal component extraction and the carbonation reaction are performed concurrently, an extracted alkali metal component is carbonated, the carbonated component is formed as a precipitate, and the carbonate precipitate is then accumulated on the surface of the slag, which causes the alkali metal component extraction to be hindered, the carbonation reaction to take longer time, and the carbonation rate to be decreased.

Further, in the conventional method, because the slag, carbonate precipitate, and residual process water/solution coexist, it is difficult to reuse process water/solution and a chemical solvent (e.g., acetic acid) used for extraction.

Therefore, as a conventional method, there has been used a method wherein alkali metal component extraction, carbonate conversion by carbon dioxide injection, and filtration for solid/liquid separation are performed in separate batches in the sequential order as shown in FIG. 3.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Embodiments of the present invention provide a system for fixing carbon dioxide. The system comprises a first reactor and a second reactor connected to the first reactor. A raw slag is introduced into the first reactor. In the first reactor, an alkali metal component is extracted from the raw slag. A solution containing the extracted alkali metal component is then discharged from the first reactor. The solution containing the extracted alkali metal component from the first reactor and carbon dioxide are introduced into the second reactor. In the second reactor, the alkali metal component contained in the introduced solution is converted to a carbonate precipitate by a carbonation reaction between the introduced carbon dioxide and the introduced solution. A submerged membrane unit is provided within the second reactor to separate the carbonate precipitate.

Preferably, the submerged membrane unit may comprise a plurality of hollow fiber membranes and a pair of hollow cases. The hollow cases are provided at upper and lower ends of the hollow fiber membranes and connected to the first reactor by a recirculation pipeline through which the solution can be recirculated into the first reactor after the carbonate precipitate is separated.

Preferably, an air diffuser is provided in the second reactor below the submerged membrane unit for delivering gaseous carbon dioxide to the inside of the second reactor.

Preferably, a vacuum pump is mounted on the recirculation pipeline.

With the system, among others, carbon dioxide can be fixed more efficiently and the solution filtrated from the submerged membrane unit can be reused in the alkali metal extraction reactor.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
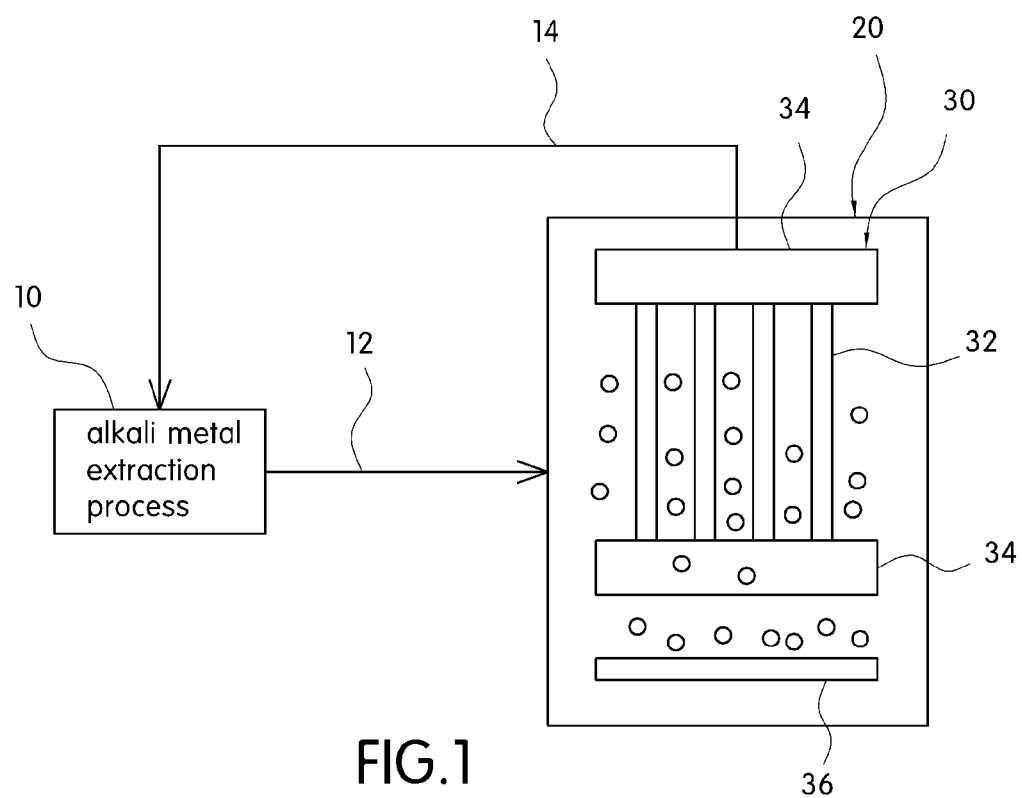
FIGS. 1 and 2 are diagrams representing systems for fixing carbon dioxide according to embodiments of the present invention.
Figure 2:
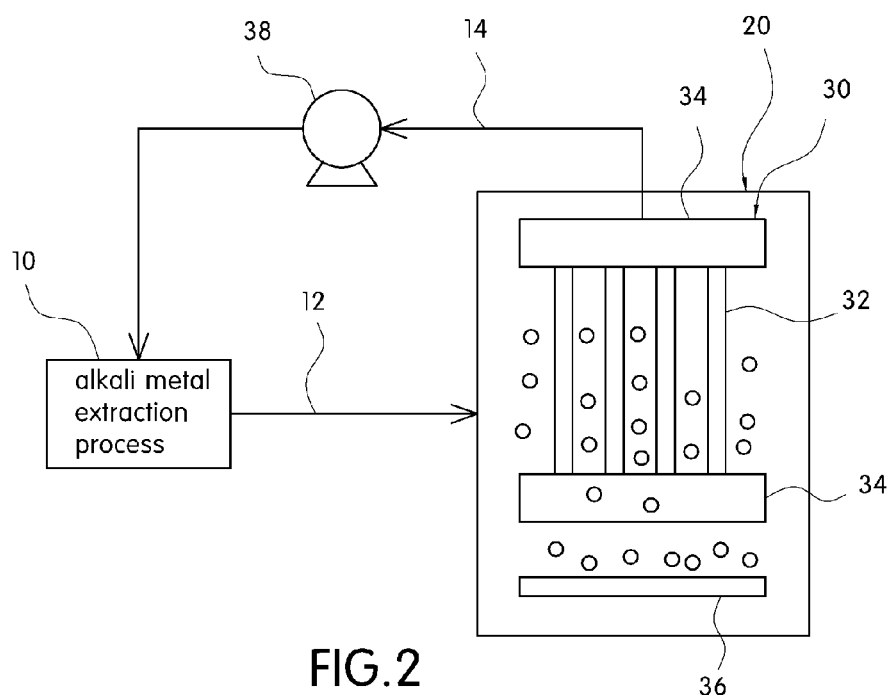
Figure 3:
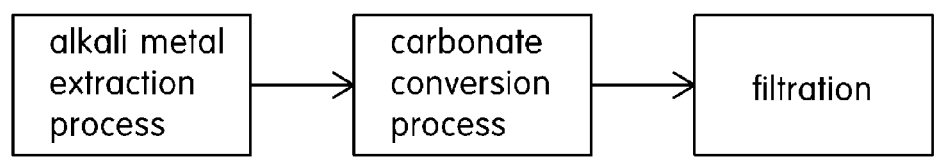
FIG. 3 is a flow chart representing a conventional method for fixing carbon dioxide.

Reference numerals set forth in the Drawings includes reference to the following elements as further discussed below:

10: alkali metal component extraction reactor
12: supply pipeline
14: recirculation pipeline
20: carbonation reactor
30: submerged membrane unit
32: hollow fiber membrane
34: hollow case
36: air diffuser
38: vacuum pump It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be.

As shown in FIG. 1, a system for fixing carbon dioxide according to an embodiment of included within the spirit and scope of the invention as defined by the appended claims the present invention comprises an alkali metal component extraction reactor (10), a carbonation reactor (20) connected to the alkali metal component extraction reactor (10), and a submerged membrane unit (30) provided within the carbonation reactor (20). A raw slag is introduced into the alkali metal component extraction reactor (10). In the alkali metal component extraction reactor (10), an alkali metal component is extracted from the raw slag. A solution containing the extracted alkali metal component is then discharged from the alkali metal component extraction reactor (10).

The discharged post-extraction solution and carbon dioxide are introduced into the carbonation reactor (20). In the carbonation reactor (20), the alkali metal component contained in the introduced solution is converted to a carbonate precipitate by a carbonation reaction between the introduced carbon dioxide and the introduced solution.

The submerged membrane unit (30) provided within the second reactor functions to separate the carbonate precipitate. Preferably, the submerged membrane unit may comprise a plurality of hollow fiber membranes (32) and a pair of hollow cases (34). The hollow fiber membranes may, suitably, be made of a polymer material such as polyethylene, cellulose acetate and the like. The hollow cases (34) are provided at upper and lower ends of the hollow fiber membranes (32). For example, the upper ends of the hollow fiber membranes (32) are inserted into one of the hollow cases (34) and the lower ends of the hollow fiber membranes (32) are inserted into the other hollow case (34) such that the hollow cases (34) are in fluid communication with each other through the hollow fiber membranes (32). In this case, an outlet of the alkali metal component extraction reactor (10) is connected with the carbonation reactor (20) through a supply pipeline (12) and an inlet of the alkali metal component extraction reactor (10) is connected with an outlet of the hollow cases (34) through a recirculation pipeline (14). In some embodiments, at least one vacuum pump (38) may be mounted at the recirculation pipeline (14).

Preferably, the system may further comprise an air diffuser (36) below the submerged membrane unit (30) within the carbonation reactor for generating carbon dioxide bubbles. The air diffuser (36) receives carbon dioxide supplied from a carbon dioxide supplier (not shown) that is connected to the carbonation reactor for supplying carbon dioxide. The amount of supplied carbon dioxide is controlled according to the amount of the alkali metal component of the solution introduced into the carbonation reactor (20).

Herein, operating of the system for fixing carbon dioxide according to the embodiment of the present invention will be described.

An alkali metal component (e.g., Ca, Mg, etc.) is extracted at the alkali metal component extraction reactor (10). In more detail, a raw slag (e.g., a slag from a blast furnace iron making process, a slag from an electric furnace steel making process, etc.) is supplied to the alkali metal component extraction reactor (10). An aqueous solution containing acetic acid is supplied as an extraction solvent with a ratio of the raw slag and the aqueous solution containing acetic acid is about 2 to about 20 (i.e., slag:solution=approx. 2~20:1). The resulting solution is stirred until at least 90% of the alkali metal component contained in the raw slag is extracted.

The post-extraction solution exited from the alkali metal component extraction reactor (10) is supplied to the carbonation reactor (20) through the supply pipeline (12). Carbon dioxide supplied from the carbon dioxide supplier is introduced to the carbonation reactor (20) via the air diffuser (36). The amount of supplied carbon dioxide is controlled according to the amount of the alkali metal component of the solution introduced into the carbonation reactor (20).

In the carbonation reactor (20), a carbonation reaction is performed and a carbonate precipitate is produced. Namely, gaseous carbon dioxide is reacted with an alkali metal ion in the carbonation reactor (20) to produce a carbonate precipitate. The carbonate precipitate is separated from the solution contained in the carbonation reactor (20) by the submerged membrane unit (30). In more detail, the carbonate precipitate exists in the carbonation reactor without being transferred through the hollow fiber membranes (20) while the residual solution (the extracted alkali metal component solution after the carbonation reaction) is transferred through the hollow fiber membrane (32) by capillary action. The solution is then transferred through the hollow case (34), and the recirculation pipeline (14) and recirculated to the alkali metal component extraction reactor (10), by operation of the vacuum pump (36), to be reused in the alkali metal component extraction.

On the other hand, the carbon dioxide bubbles supplied by the air diffuser (36) are formed to have a small diameter (e.g., 0.5 mm or less) prevent suspended solids from forming a cake layer on the surface of the hollow fiber membranes (32), thereby improving filtration efficiency of the alkali metal component solution.

According to the present invention, since the extraction, carbonation, and filtration are performed continuously, carbon dioxide can be fixed in a cost-effective and simpler manner. Further, a solution filtered from the submerged membrane unit can be reused in the alkali metal extraction process.

What is claimed is:

1. A system for fixing carbon dioxide, the system comprising:
   a first reactor into which a slag is to be introduced, in which an alkali metal component is to be extracted from the slag, and from which a solution containing the extracted alkali metal component is to be discharged;
   a second reactor into which carbon dioxide and the solution containing the extracted alkali metal component are to be introduced and in which the alkali metal component contained in the introduced solution is to be converted to a carbonate precipitate by a carbonation reaction between the introduced carbon dioxide and the introduced solution, wherein a submerged membrane unit is provided within the second reactor to separate the carbonate precipitate;
   a recirculation pipeline between the first reactor and the second reactor to recirculate the solution contained in the second reactor into the first reactor; and
   a supply pipeline between the first reactor and the second reactor to supply the solution contained in the first reactor into the second reactor,
   wherein a vacuum pump is mounted on the recirculation pipeline,
   wherein the submerged membrane unit comprises: a plurality of hollow fiber membranes and a pair of hollow cases provided at upper and lower ends of the hollow fiber membranes, wherein the hollow cases are connected to the first reactor by the recirculation pipeline through which the solution contained in the second reactor can be recirculated to the first reactor, and wherein an air diffuser is provided in the second reactor below the submerged membrane unit for delivering gaseous carbon dioxide to the inside of the second reactor.

* * * * *